United States Patent
Maruyama

(10) Patent No.: US 6,819,504 B2
(45) Date of Patent: Nov. 16, 2004

(54) HIGH NA OBJECTIVE LENS FOR OPTICAL PICK-UP

(75) Inventor: Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 65 days.

(21) Appl. No.: 10/235,643

(22) Filed: Sep. 6, 2002

(65) Prior Publication Data

US 2003/0156334 A1 Aug. 21, 2003

(30) Foreign Application Priority Data

Sep. 7, 2001 (JP) .......................... 2001-271452

(51) Int. Cl.⁷ .......................... G02B 3/02; G02B 13/18; G02B 27/14; G11B 7/00; G11B 7/135
(52) U.S. Cl. .................... 359/719; 359/637; 369/44.32; 369/112.01; 369/112.23
(58) Field of Search ................. 359/637, 641, 359/718, 719, 738, 796; 369/112.01, 112.08, 112.23, 112.26, 44.23, 44.32

(56) References Cited

U.S. PATENT DOCUMENTS 5,754,513 A    5/1998   Yagi et al.
6,411,442 B1   6/2002   Ota et al.
2001/0015939 A1 8/2001  Kubo

FOREIGN PATENT DOCUMENTS

| EP | 1043615 | 10/2000 |
| JP | 11190818 | 7/1999 |
| JP | 2000-131603 | 5/2000 |

*Primary Examiner*—Georgia Epps
*Assistant Examiner*—Alicia M. Harrington
(74) *Attorney, Agent, or Firm*—Greenblum & Bernstein, P.L.C.

(57) ABSTRACT

A single-element objective lens for an optical pick-up directs an incident light beam to a data recording surface of an optical disc through a cover layer to form a beam spot thereon. A numerical aperture of the objective lens is 0.7 or more. The objective lens is configured to compensate for coma such that a characteristic of a change of spherical aberration due to a degree of divergence/convergence of the incident beam is comparable with respect to a characteristic of a change of spherical aberration due to variation of the cover layer so that the change of spherical aberration due to variation of the cover layer can be cancelled by the change of spherical aberration due to a degree of divergence/convergence of the incident beam.

11 Claims, 10 Drawing Sheets

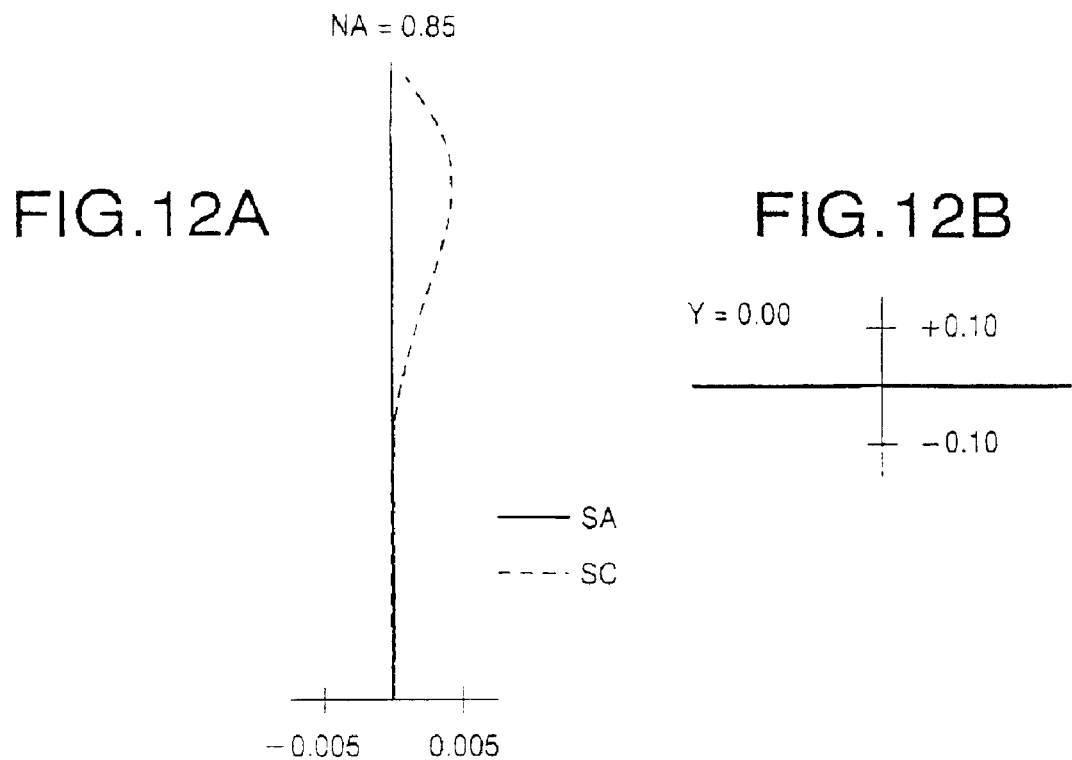
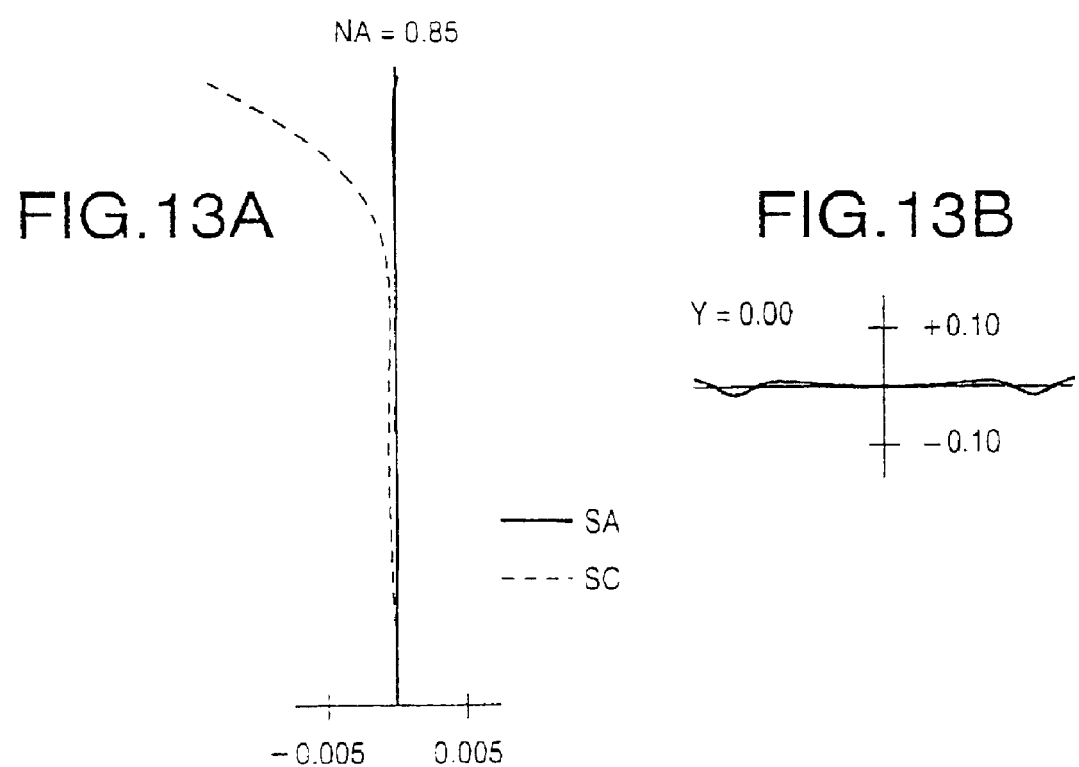

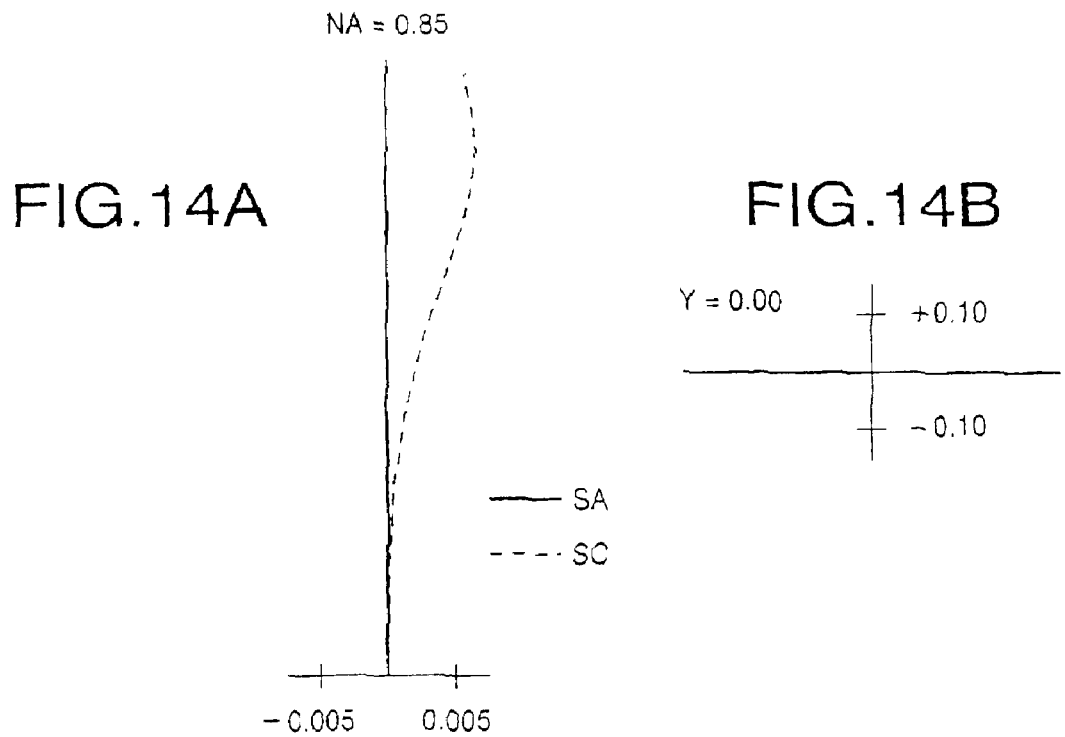
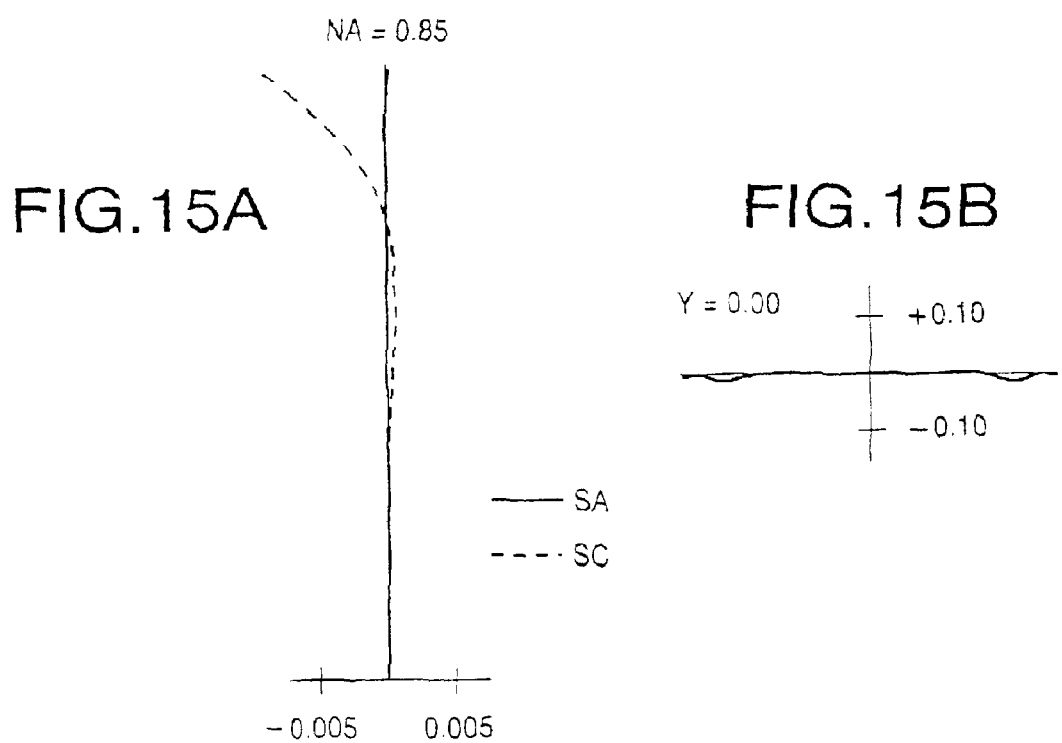

HIGH NA OBJECTIVE LENS FOR OPTICAL PICK-UP

BACKGROUND OF THE INVENTION

The present invention relates to an objective lens for an optical pick-up of an optical disc drive, and more particularly to an objective lens having an NA (numerical aperture) of 0.7 or more. The invention also relates to an optical pick-up employing such an objective lens.

The NA of such an objective lens is determined in accordance with a data density of a recording medium. For example, the NA of an objective lens of an optical pick-up for a CD (compact disc) is approximately 0.45. The NA of the objective lens for a DVD (digital versatile disc) is approximately 0.6.

The objective lens of the CD drives or DVD drives is generally a single lens formed by plastic molding, and having aspherical surfaces as both refraction surfaces. The objective lens for the CD or DVD drive is required such that spherical aberration is well compensated for in order to converge an incident light beam as a diffraction limited spot.

Further, coma should also be compensated counting decentering status of the objective lens due to manufacturing and/or assembly errors. To meet the above requirements, the conventional objective lens, which is typically a single lens having aspherical surfaces, is designed such that the spherical aberration is compensated in a predetermined reference status (which is generally a status where parallel light is incident on the objective lens), and sine condition is satisfied.

Recently, an optical disc having data recording density higher than that of the DVD is suggested. For such an optical disc, the NA of the objective lens is required to be 0.7 or more. However, if a focal length of the lens is shortened in order to raise the NA, if an objective lens is a single lens element, the curvature of the lens is higher, which is difficult to form accurately according to a current processing technique.

Japanese Patent Provisional Publication No. HEI 11-190818 discloses a high NA objective lens in which curvature of each lens surface is suppressed by constituting the objective lens with two lens elements.

However, such an objective lens consisting of two lens elements is larger in weight and volume in comparison with the objective lens having a single lens element. Therefore, for such a lens having two lens elements, a conventional fine actuator which moves the objective lens in its axial direction for focusing can not be used.

Further, the two lens elements must be fixed onto a frame and an optical axes of the lens elements must be aligned with respect to each other. In such a case, the number of manufacturing processes and the number of components may increase. Further, a working distance (i.e., a distance between a rear surface of the objective lens and a surface of a cover layer of an optical disc) of the objective lens disclosed in the publication is a range of 3.5 $\mu$m through 50 $\mu$m. This working distance is significantly smaller than that of a single-element lens having the same focal length.

An error of a thickness of a cover layer of an optical disc varies depending on manufacturing methods. It is difficult to reduce the error of the thickness of the cover layer less than 10 $\mu$m according to the current technique. In the DVD standard, a tolerance of the thickness of the cover layer is ±0.03 mm.

If an optical disc includes an error in the thickness of the cover layer, spherical aberration is caused. The amount of the spherical aberration increases as the NA of the objective lens increases.

As described above, the conventional objective lens for CD's or DVD's has relatively low NA, and therefore, the amount of spherical aberration caused by the error of the thickness of the optical disc is relatively small. Accordingly, in the conventional optical pick-up, it is unnecessary to compensate for the spherical aberration caused by the error of the thickness.

However, for lenses whose NA is 0.7 or more, the amount of the spherical aberration caused by the thickness error of 10 $\mu$m becomes impracticably large, and a diameter of a beam spot formed by the objective lens cannot be reduced to a practicable value if the spherical aberration is not compensated for.

In Japanese Patent Provisional Publication No. 2000-131603, technique for compensating for such a spherical aberration is disclosed. Specifically, according to the publication, the objective lens constituted of two lens elements disclosed in the afore-mentioned Publication No. HEI 11-190818 is used, and further, a compensation lens group is provided between the objective lens and a light source. The compensation lens consists of positive and negative lens elements. By adjusting a distance between the positive and negative lens elements of the compensation lens group, degree of divergence/convergence of light incident on the objective lens is adjusted so that the spherical aberration caused by the thickness error of an optical disc is compensated for.

Generally, when an objective lens, which is configured such that spherical aberration with respect to light having predetermined degree of divergence/convergence is compensated for, is used, the spherical aberration changes when the degree of divergence/convergence of the incident light changes. Therefore, spherical aberration caused by the thickness error of an optical disc can be canceled by changing the degree of divergence/convergence of the light incident on the objective lens to generate spherical aberration in an opposite direction.

It should be noted that in an optical system disclosed in the Patent Provisional Publication 2000-131603, spherical aberration caused by varying the degree of divergence/convergence of the incident light mainly consists of third order components, while the spherical aberration caused by the thickness error of an optical disc includes components higher than the third order. Therefore, even though the degree of divergence/convergence of the incident light is changed, the spherical aberration cannot be compensated for completely. In the publication, therefore, by varying a distance between the two lens elements of the objective lens, the higher order components of the spherical aberration is compensated for.

However, in order to adjust the distance between the lens elements of the objective lens, an adjusting mechanism should be provided on a lens frame of the objective lens, which is mounted on the fine actuator. Such a configuration requires a further burden to the actuator and troublesome adjusting operation.

SUMMARY OF THE INVENTION

The present invention is advantageous in that it provides an objective lens for an optical pick-up which enables sufficient correction of a spherical aberration caused by a thickness error of an optical disc only by changing the degree of divergence/convergence of the light incident on the objective lens.

According to embodiments of the, invention, there is provided a single-element objective lens for an optical pick-up. The objective lens directs an incident light beam to a data recording surface of an optical disc through a cover layer to form a beam spot thereon. A numerical aperture of the objective lens is 0.7 or more. The objective lens is configured to compensate for coma such that a characteristic of a change of spherical aberration due to a degree of divergence/convergence of the incident beam is substantially comparable with respect to a characteristic of a change of spherical aberration due to variation of the cover layer so that the change of spherical aberration due to variation of the cover layer can be cancelled by the change of spherical aberration due to a degree of divergence/convergence of the incident beam.

Optionally, an amount of an offence against a sine condition has a positive maximum value at a position within a range of 60% to 90% of an effective radius of the objective lens, the difference with respect to the sine condition monotonously decreasing on a peripheral side with respect to the position at which the difference has the maximum value.

Further optionally, the objective lens may be configured to satisfy condition:

$$0.001 < SC_{max}/f < 0.013,$$

where $SC_{max}$ represents the positive maximum value of an amount of an offence against the sine condition when the incident beam is a parallel light beam, and f represents a focal length of the objective lens.

Alternatively or optionally, the objective lens is configured to satisfy condition:

$$-0.37 < \Delta W(1.0) \times \lambda/(f \times m \times NA_{max}^6) < -0.25,$$

where, $\Delta W(1.0)$ represents wavefront aberration in an outermost position of the effective aperture, $\lambda$ represents a wavelength of the light beam, m represents a lateral magnification, $NA_{max}$ represents a numerical aperture corresponding to the effective aperture, and f represents a focal length of the objective-lens.

Alternatively or optionally, the objective lens is configured to satisfy condition:

$$0.050 < f/r_2 < 0.110,$$

where, $r_2$ represents a radius of curvature of a surface of the objective lens facing the optical disc, and f represents a focal length of the objective lens.

According to some embodiments, there is provided a single-element objective lens for an optical pick-up, the objective lens directing an incident light beam to a data recording surface of an optical disc through a cover layer to form a beam spot. A numerical aperture of the objective lens being 0.7 or more, and the objective lens is configured to compensate for coma such that spherical aberration caused by a change of a degree of divergence/convergence of the incident light beam is substantially proportional to a value OP expressed by equation:

$$OP = (1 - \sqrt{1-NA^2})/n - (n - (\sqrt{n^2-NA^2})),$$

where, NA represents a numerical aperture of the objective lens, and n represents a refractive index of the cover layer.

According to the embodiments, there is also provided an optical pick-up, which employs a laser source that emits a laser beam, any one of the single-element objective lenses described above, and an optical device capable of changing the degree of divergence/convergence of the laser beam incident on the objective lens.

Optionally, the laser source may include a laser diode that emits a divergent laser beam, and a collimating lens that collimates the divergent laser beam emitted by the laser diode, the collimated laser beam being emitted from the laser source to the objective lens. The optical device includes the collimating lens, and the degree of divergence/convergence of the laser beam emitted by the laser source is changed by changing a distance between the laser diode and the collimating lens.

BRIEF DESCRIPTION OF THE ACCOMPANYING DRAWINGS

FIG. 1 schematically shows a configuration of an optical pick-up to which the present invention is applied;

FIG. 12A is a graph showing the spherical aberration and the sine condition under the reference design condition, according to the third embodiment;

FIG. 12B is a graph showing the wavefront aberration under the reference design condition, according to the third embodiment;

FIG. 13A shows the compensated spherical aberration and sine condition, according to the third embodiment;

FIG. 13B shows the compensated wavefront aberration after the compensation according to the third embodiment;

FIG. 14A is a graph showing the spherical aberration and the sine condition under the reference design condition, according to the fourth embodiment;

FIG. 14B is a graph showing the wavefront aberration under the reference design condition, according to the fourth embodiment;

FIG. 15A shows the compensated spherical aberration and sine condition, according to the fourth embodiment;

FIG. 15B shows the compensated wavefront aberration after the compensation according to the fourth embodiment;

DETAILED DESCRIPTION OF THE EMBODIMENTS

Hereinafter, objective lenses and optical pick-up employing such objective lenses according to embodiments of the present invention will be described with reference to the accompanying drawings.

Figure 1:
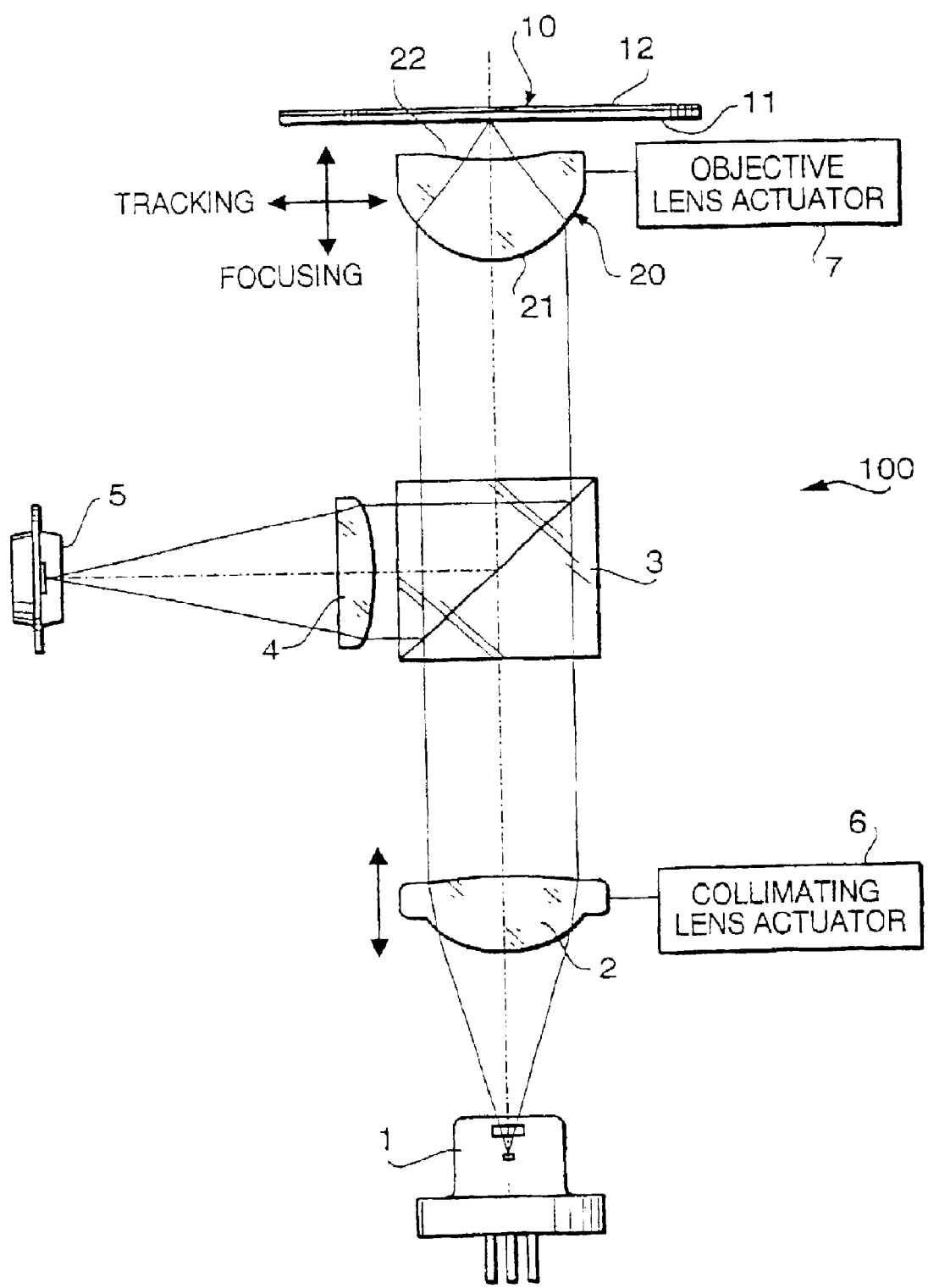

FIG. 1 schematically shows a configuration of an optical pick-up 100, to which the present invention is applied. The optical pick-up 100 shown in FIG. 1 is used for an optical disc having a high recording density which is higher than a recording density of DVD. An NA of an objective lens 20 employed in the optical pick-up 100 is equal to or more than 0.7. The optical pick-up 100 employs a blue laser beam having a wavelength of 405 nm.

As shown in FIG. 1, the optical pick-up includes a laser diode 1 which emits a diverging laser beam having a wavelength of 405 nm, a collimating lens 2 which collimates the laser beam emitted by the laser diode 1, and the objective lens 20 which converges the laser beam, through a transparent cover layer 11, on a data recording surface of an optical disc 10. The optical pick-up 100 further includes a beam splitter 3 which splits the light beam reflected by the optical disc 10, a condenser lens 4 which converges the light beam split by the beam splitter 3, and a light receiving element 5 which receives the light converged by the condenser lens 4 and outputs a plurality of kinds of signals.

The laser diode 1 and the collimating lens 2 constitute a light source unit. Further, the optical pick-up 100 is provided with an collimating lens actuator 6, which moves the collimating lens 2 in a direction of the optical axis thereof so that degree of divergence/convergence of a light beam incident on the objective lens 20 is varied.

Alternatively, the laser diode 1 may be moved in the direction of the optical axis of the collimating lens in order to vary the degree of divergence/convergence of the light beam incident on the objective lens 20. Further alternatively, positive and negative lenses may be arranged between the collimating lens 2 and the objective lens 20, and a distance between the positive and negative lenses is adjusted, as in the configuration disclosed in the aforementioned Japanese Patent Provisional Publication 2000-131603.

For the purpose of tracking and focusing operations, the objective lens 20 is mounted on an objective lens actuator 7. The objective lens 20 is a single element lens whose NA is 0.7 or more. Each of the first surface 21 and the second surface 22 of the objective lens 20 is an aspherical surface. Further, a correction condition of coma of the objective lens 20 is configured such that spherical aberration which changes depending on the thickness of the cover layer 11 and the spherical aberration which changes as the degree of divergence/convergence of the laser beam incident on the objective lens 20 cancel each other. With this configuration, a characteristic of a change of the spherical aberration depending on the degree of divergence/convergence of the laser beam incident on the objective lens 20 is substantially comparable with respect to a characteristic of a change of the spherical aberration depending on the thickness of the cover layer 11. Accordingly, if the spherical aberration is caused due to variation of the thickness of the cover layer 11, it is well compensated for by moving the collimating lens 2 in the direction of the optical axis thereof.

It should be noted that to change the degree of the divergence/convergence of the beam incident on the objective lens 20 is, in view of abaxial rays, to change the incident angle of the abaxial rays with respect to a the first surface 21. Therefore, to change the spherical aberration by changing the degree of divergence/convergence of the incident beam is, in another aspect, to change the abaxial coma by changing the incident angle of the abaxial rays with respect to the first surface 21 of the objective lens 20. Therefore, if the abaxial coma includes the higher order components, and the objective lens 20 is designed such that compensation condition of coma changes appropriately depending on the incident angle of the abaxial rays, the characteristic of the change of the spherical aberration due to the change of the degree of divergence/convergence of the incident beam can be controlled as desired.

To achieve the above-mentioned correction condition of the coma, the objective lens 20 is configured such that an amount of an offence against a sine condition has a positive maximum value at a position within a range of 60% to 90% of a radius h of an effective aperture of the objective lens 20, and decreases monotonously outside the position at which the shifting amount has the peak value. Specifically, condition (1) below is satisfied.

$$0.001 < SC_{max}/f < 0.013 \qquad (1)$$

where, $SC_{max}$ represents the maximum value of an amount of an offence against the sine condition when a parallel light beam is incident on the objective lens 20, and f represents a focal length of the objective lens 20.

Further, when the spherical aberration is generated by changing an imaging magnification, the objective lens 20 is configured to satisfy condition (2).

$$-0.37 < \Delta W(1.0) \times \lambda/(f \times m \times NA_{max}^6) < -0.25 \qquad (2)$$

where, $\Delta W(1.0)$ represents the wavefront aberration in the outermost region of the effective aperture, $\lambda$ represents a wavelength, m represents the imaging magnification (a lateral magnification), and $NA_{max}$ represents the NA corresponding to the effective aperture.

Further, the objective lens 20 preferably satisfies condition (3) below.

$$0.050 < f/r_2 < 0.110 \qquad (3)$$

where $r_2$ represents a curvature of radius of the second surface which faces the optical disc 10.

It should be noted that, first and second embodiments satisfy condition (3), but third through sixth embodiments do not.

Even though condition (3) is not satisfied, the spherical aberration is compensated for so that the residual spherical aberration does not cause any problem practically. If condition (3) is satisfied, an excellent compensation effect is obtained and relatively wide tolerances of a thickness and/or a refractive index is obtained.

Furthermore, in the objective lens 20 according to the embodiments, a compensation condition of coma is set such that a wavefront aberration which is generated due to a change of the degree of divergence/convergence of the light beam incident on the objective lens 20 is substantially proportional to a value OP represented by equation (4) below.

$$OP = (1 - \sqrt{(1-NA^2)})/n - (n - (\sqrt{(n^2-NA^2)})) \qquad (4)$$

where NA represents a numerical aperture and n represents a refractive index of the cover layer 11.

Conventional objective lenses are generally designed such that the spherical aberration is well compensated under its reference design condition, and the sine condition is satisfied. In such lenses, however, the characteristic of the change of the spherical aberration caused by the change of the thickness of the cover layer is different from the characteristic of the change of the spherical aberration according to the change of the degree of divergence/convergence of the incident beam. According to the embodiments of the present invention, the objective lens 20 is designed such that the compensation condition of coma is adjusted and the sine condition is not satisfied. With this design, it becomes possible to make the characteristic of the change of the spherical aberration caused by the change of the thickness of the cover layer and the characteristic of the change of the spherical aberration according to the change of the degree of divergence/convergence of the incident beam substantially comparable with respect to each other, thereby the spherical aberration can be well compensated by changing the degree of divergence/convergence of the incident beam.

Numerical Embodiments

Hereinafter, six numerical embodiments and a comparative example will be described. Each of the embodiments and the comparative example shows an objective lens which is used for the optical disk 10 provided with a cover layer 11 having a thickness of 0.1 mm.

First Embodiment

Figure 2:
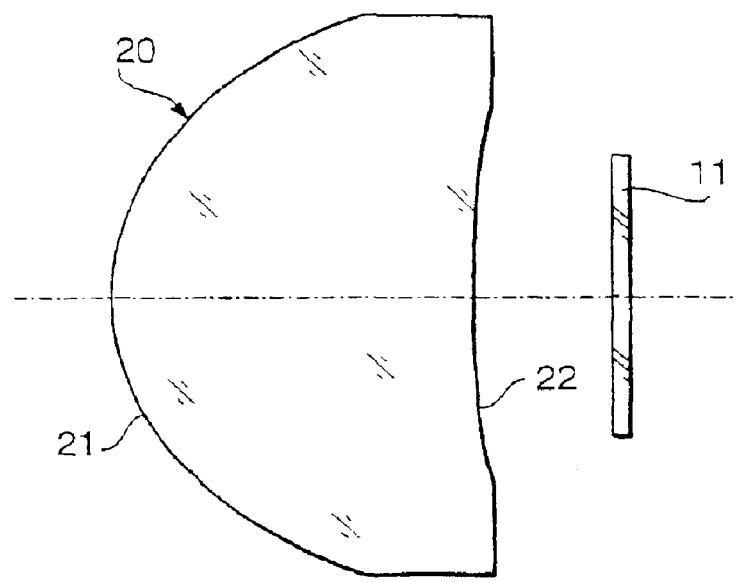
FIG. 2 shows an objective lens according to the first embodiment and the cover layer of the optical disc.

FIG. 2 shows an objective lens 20 according to the first embodiment and the cover layer 11 of the optical disc.

TABLE 1 indicates the numerical configuration of the objective lens 20 according to the first embodiment. In TABLE 1 (and following TABLEs), f represents a focal length of the objective lens 20, r represents a radius of curvature (unit: mm) of each surface, d represents a distance (unit: mm) between adjoining surfaces along the optical axis, and n represents a refractive index when a light beam having a wavelength of 405 nm is used. Surface Number #1 and #2 represent the first surface 21 and the second surface 22 of the objective lens 20, respectively; and Surface Number #3 and #4 represent surfaces of the cover layer 11.

TABLE 1

| f = 2.350 Surface Number | NA 0.851 | | |
|---|---|---|---|
| | r | d | N |
| #1 | 1.735 | 2.350 | 1.76050 |
| #2 | 24.657 | 0.913 | |
| #3 | ∞ | 0.100 | 1.62231 |
| #4 | ∞ | | |

Each of the first and second surfaces 21 and 22 is an aspherical surface and is rotationally symmetric with respect to the optical axis.

It is generally known that an aspherical surface is expressed by a polynomial indicated below.

$$X(h) = \frac{Ch^2}{1 + \sqrt{1 - (1+\kappa)C^2h^2}} + A_4h^4 + A_6h^6 + A_8h^8 + A_{10}h^{10} + A_{12}h^{12}$$

where, $X(h)$ is a SAG amount representing a distance between a plane tangential to the aspherical surface at a point where the optical axis intersects with the aspherical surface and a point on the aspherical surface whose height with respect to the optical axis is h; C represents a curvature $(=1/r)$ of the aspherical surface on the optical axis; $\kappa$ is a conical coefficient; and $A_4$, $A_6$, $A_8$, $A_{10}$ and $A_{12}$ are forth, sixth, eighth, tenth, and twelfth order aspherical coefficients. Numerical values of these factors are indicated in TABLE 2.

TABLE 2

| | 1st surface (#1) | 2nd surface (#2) |
|---|---|---|
| $\kappa$ | −0.3850 | 0.0000 |
| $A_4$ | $1.07300 \times 10^{-04}$ | $5.57000 \times 10^{-02}$ |
| $A_6$ | $7.14600 \times 10^{-05}$ | $-2.95400 \times 10^{-02}$ |
| $A_8$ | $-3.65000 \times 10^{-06}$ | $1.11800 \times 10^{-02}$ |
| $A_{10}$ | $8.84100 \times 10^{-06}$ | $-2.41100 \times 10^{-03}$ |
| $A_{12}$ | $-2.21700 \times 10^{-06}$ | $2.24700 \times 10^{-04}$ |

The objective lens 20 according to the first embodiment is designed with a condition where an object distance is infinity (i.e., the light beam incident on the objective lens is collimated) and the thickness of the cover layer 11 is 0.100 mm being a design reference condition.

Figure 3A:
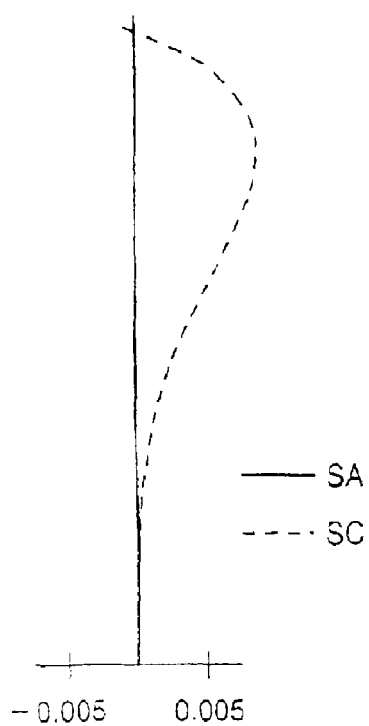
FIG. 3A is a graph showing the spherical aberration and a sine condition under the design condition, according to a first embodiment.

FIG. 3A shows a graph of the spherical aberration (SA) and a graph of an amount of an offence against the sine condition under the design condition (an amount of an offence against the sine condition is referred to as "sine condition" hereinafter). In FIG. 3A, a lateral axis indicates the amount of the aberration (unit: mm), and a vertical axis indicates a numerical aperture number (NA).

Figure 3B:
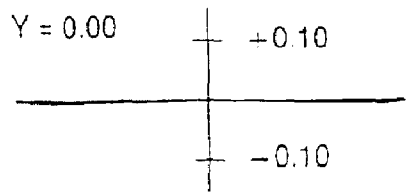
FIG. 3B is a graph showing the wavefront aberration.

FIG. 3B shows a graph of the wavefront aberration. In FIG. 3B, a vertical axis indicates the amount of the aberration (unit: wavelength), and a lateral axis indicates a height from the optical axis.

As shown in FIG. 3A, the sine condition (SC) has a maximum value at a position approximately 80% of the radius h of the effective aperture, and decreases monotonously in a region outside that position. The spherical aberration (SA) is well corrected (i.e., SA is nearly zero). Further, as shown in FIG. 3B, the wavefront aberration is well suppressed.

Assuming that the thickness of the cover layer 11 changes by +0.030 mm, the spherical aberration increases in an overcorrected direction by a large amount if the degree of divergence/convergence of the light beam incident thereon remains in the reference condition (i.e., the object distance stays infinity). In this case, the amount of change of the wavefront aberration $\Delta W(1.0)$ (i.e., an aberration of marginal rays) in the outermost region (i.e., NA is 0.0851) of the effective aperture is $-3.82\lambda$, and rms (root-mean-square) of the wavefront aberration is $0.308\lambda$.

It should be noted that, this change of the wavefront aberration is caused only by the variation of the thickness of the cover layer 11, and is not changed even if the design of the object lens is changed as far as the NA of the objective lens and the wavelength of the light beam to be used are not changed.

It is possible to compensate for the spherical aberration by moving the collimating lens 2 toward the laser diode 1 along the optical axis to change the degree of divergence/convergence of the light beam incident on the objective lens 20.

Figure 4A:
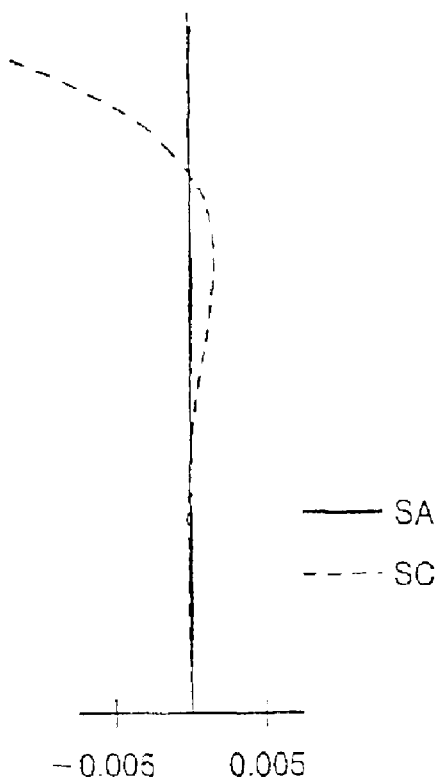
FIG. 4A is a graph showing a spherical aberration and a sine condition according to the first embodiment when a compensation is applied.
Figure 4B:
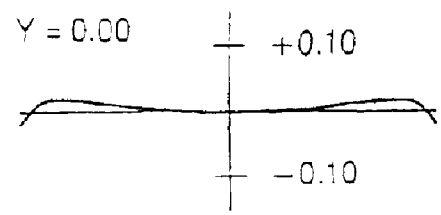
FIG. 4B shows a wavefront aberration when the compensation is applied.

If a diverging light beam corresponding to the object distance of $-420$ mm is incident on the objective lens 20, the imaging magnification m becomes $-0.0060$. FIG. 4A shows a graph of spherical aberration and a sine condition, and FIG. 4B shows a wavefront aberration after such a compensation (i.e., change of the degree of divergence/convergence the of light beam incident on the objective lens 20) applies.

As shown if FIG. 4A, the spherical aberration is well compensatef for in overall area of the effective aperture. In this case, the amount of change of the wavefront aberration $\Delta W(1.0)$ in the outermost region of the effective aperture is $3.83\lambda$. Accordingly, the wavefront aberration due to an error of a thickness of the cover layer 11 can be cancelled. As a result, the wavefront aberration is well compensated for as shown in FIG. 4B. The rms value of the wavefront aberration is $0.008\lambda$.

As described above, if the objective lens having the positive maximum value of sine condition at a position approximately 80% of the radius of the effective aperture is used, the spherical aberration due to the error of the thickness of the optical disc can be well compensated for by changing the degree of divergence/convergence of the light beam incident on the objective lens.

Figure 5A:
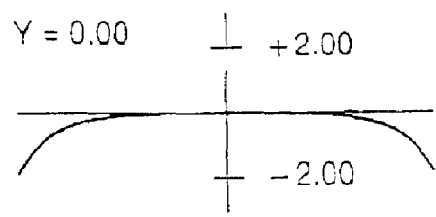
FIG. 5A is a graph showing the wavefront aberration when the thickness of the objective lens is changed.

If the thickness of the objective lens 20 decreases by 0.010 mm due to an manufacturing error, the wavefront aberration deteriorates as shown in FIG. 5A. In this case, the amount of change of the wavefront aberration $\Delta W(1.0)$ in the outermost area of the effective aperture is $-1.895\lambda$, and the rms value of the wavefront aberration is $0.160\lambda$. Such an objective lens can not be used for the optical pick-up.

Figure 5B:
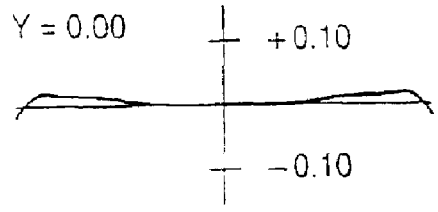
FIG. 5B is a graph showing the wavefront aberration after compensation is applied.

If the collimating lens 2 is moved, along its optical axis, toward the laser diode 1 so that a diverging beam corresponding to the object distance of $-830$ mm is incident on the objective lens 20, the spherical aberration can be decreased to nearly zero. In this case, the imaging magnification m is $-0.00283$. FIG. 5B shows a graph of the wavefront aberration after such a compensation applies. By the compensation, the amount of the wavefront aberration $W(1.0)$ in the outermost area of the effective aperture becomes $-0.018\lambda$, and the rms value of the wavefront aberration becomes $0.007\lambda$.

COMPARATIVE EXAMPLE

Next, an objective lens 30 according to a comparative example will be described. The objective lens 30 has a substantially similar specification to the first embodiment in terms of the focal length, NA, radius of curvature and the like, while designed in accordance with a conventional design method.

In this specification, the conventional design method stands for a method in which the spherical aberration is completely compensated and the sine condition is almost satisfied under a reference design condition.

Figure 6:
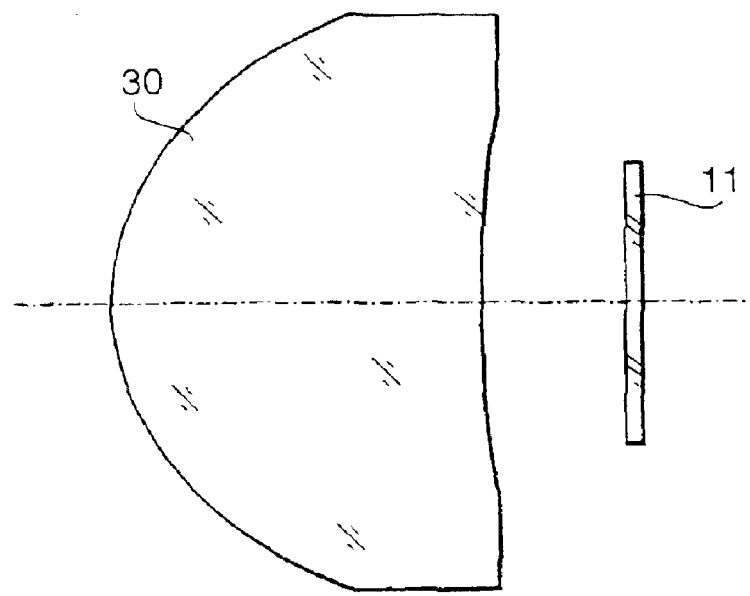
FIG. 6 shows the objective lens and the cover layer of the optical disc according to a comparative example.

FIG. 6 shows the objective lens 30 and the cover layer 11 of the optical disc. The numerical structure of the objective lens 30 is indicated in TABLE 3, and the coefficients representing the aspherical surfaces are indicated in TABLE 4.

TABLE 3

| f = 2.350 Surface Number | NA 0.851 | | |
|---|---|---|---|
| | r | d | N |
| #1 | 1.741 | 2.380 | 1.76050 |
| #2 | 24.984 | 0.913 | |
| #3 | ∞ | 0.100 | 1.62231 |
| #4 | ∞ | | |

TABLE 4

| | 1st surface | 2nd surface |
|---|---|---|
| κ | −0.6500 | 0.0000 |
| A4 | $6.21100 \times 10^{-03}$ | $5.09100 \times 10^{-02}$ |
| A6 | $9.61900 \times 10^{-04}$ | $-2.86700 \times 10^{-02}$ |
| A8 | $1.71600 \times 10^{-04}$ | $9.05300 \times 10^{-03}$ |
| A10 | $5.12800 \times 10^{-06}$ | $-1.57000 \times 10^{-03}$ |
| A12 | $6.18000 \times 10^{-06}$ | $1.15000 \times 10^{-04}$ |

The design reference condition for designing the objective lens 30 according to the comparative example is a condition where the object distance is infinity and the thickness of the cover layer 11 is 0.100 mm.

Figure 7A:
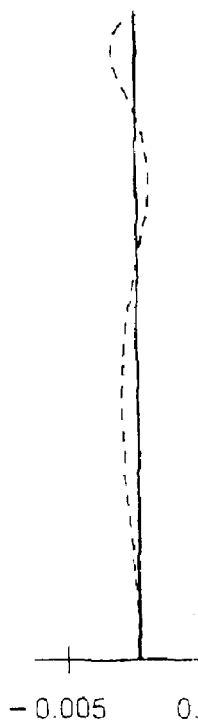
FIG. 7A is a graph showing the spherical aberration and the sine condition under the reference design condition in accordance with the comparative example.
Figure 7B:
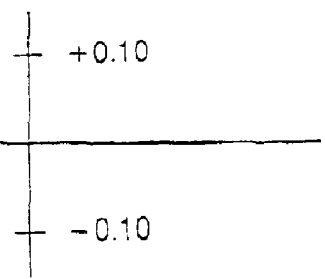
FIG. 7B is a graph showing the wavefront aberration of the comparative example.

FIG. 7A is a graph showing the spherical aberration (SA) and the sine condition under the reference design condition, and FIG. 7B is a graph showing the wavefront aberration. As shown in FIG. 7A, the spherical aberration is well compensated for under the reference design condition. The sine condition (SC) is satisfied substantially all over the aperture. Further, as shown in FIG. 7B, the wavefront aberration is also well compensated for under the reference design condition.

Figure 8:
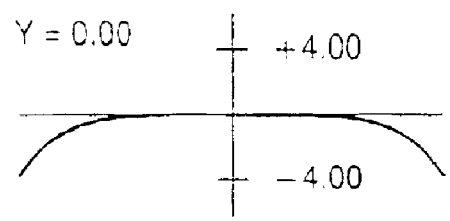
FIG. 8 shows the wavefront aberration when the thickness of the cover layer is changed, in accordance with the comparative example.

When the thickness of the cover layer 11 is changed by +0.030 mm, if the degree of divergence/convergence of the light beam incident thereon remains as in the reference condition, the amount of change of the wavefront aberration $\Delta W(1.0)$ in the outermost region (i.e., NA is 0.0851) of the effective aperture is $-3.82\lambda$, and the rms value of the wavefront aberration is $0.308\lambda$similarly to those of the first embodiment. FIG. 8 shows such a condition.

Figure 9A:
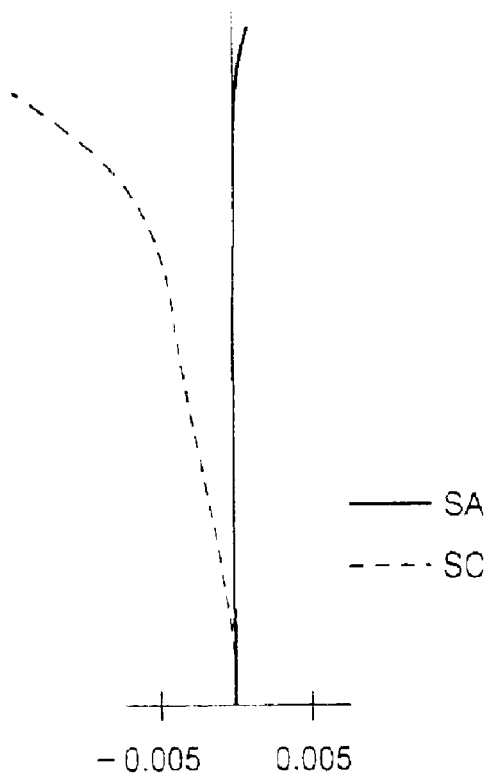
FIG. 9A shows the spherical aberration and the sine condition according to the comparative example.
Figure 9B:
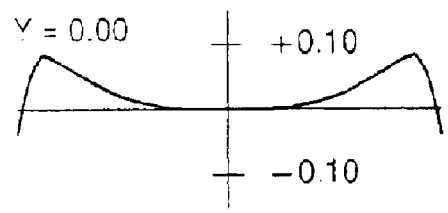
FIG. 9B shows the wavefront aberration according to the comparative example.

Under this condition, compensation is attempted by directing a diverging light beam corresponding to the object distance of $-420$ mm onto the objective lens 30. The results are shown in FIGS. 9A and 9B. That is, FIG. 9A shows the spherical aberration and the sine condition, and FIG. 9B shows the wavefront aberration. As understood from FIG. 9A, the spherical aberration is compensated for, but high order spherical aberration remains as shown in FIG. 9B. The rms value of the wavefront aberration is 0.027λ. Therefore, the objective lens 30 may be employed in an optical pick-up for a single layer optical disc as in this embodiment. However, if such an objective lens is used for a multi-layer optical disc and/or a plurality of discs according to different standards defining different thickness of the cover layer, the wavefront aberration may be too large and a desired converging performance may not be achieved.

As described above, according to the comparative example, the wavefront aberration is deteriorated when the compensation is attempted. It is because the objective lens 30 is designed to satisfy the sine condition under the reference design condition, and the characteristic of the spherical aberration caused by changing the degree of the divergence/convergence of the incident light beam is different from the characteristic of the spherical aberration due to the change of the cover layer, which cannot cancel each other.

Second Embodiment

The objective lens 20 according to the second embodiment will be described hereinafter. It should be noted that the objective lenses according to the second through sixth embodiments have substantially the same appearance and therefore drawings corresponding to FIG. 1 will not be provided.

The numerical configuration of the objective lens 20 according to the second embodiment will be indicated in TABLE 5, and coefficients indicating the spherical surfaces thereof are indicated in TABLE 6.

TABLE 5

| f = 2.350 Surface | NA 0.851 | | |
|---|---|---|---|
| Number | r | d | N |
| #1 | 1.753 | 2.400 | 1.76250 |
| #2 | 32.977 | 0.896 | |
| #3 | ∞ | 0.100 | 1.62231 |
| #4 | ∞ | | |

TABLE 6

| | 1st surface | 2nd surface |
|---|---|---|
| κ | −0.6500 | 0.0000 |
| A4 | $3.21090 \times 10^{-03}$ | $6.01370 \times 10^{-02}$ |
| A6 | $6.11800 \times 10^{-04}$ | $-2.80990 \times 10^{-02}$ |
| A8 | $1.42000 \times 10^{-04}$ | $5.51600 \times 10^{-03}$ |
| A10 | $-6.55600 \times 10^{-08}$ | $5.49000 \times 10^{-05}$ |
| A12 | $6.40300 \times 10^{-06}$ | $-1.31000 \times 10^{-04}$ |

The reference design condition for designing the objective lens 20 according to the second embodiment is a condition where the object distance is infinity (i.e., the light beam incident on the objective lens is parallel light) and the thickness of the cover layer 11 is 0.100 mm.

Figure 10A:
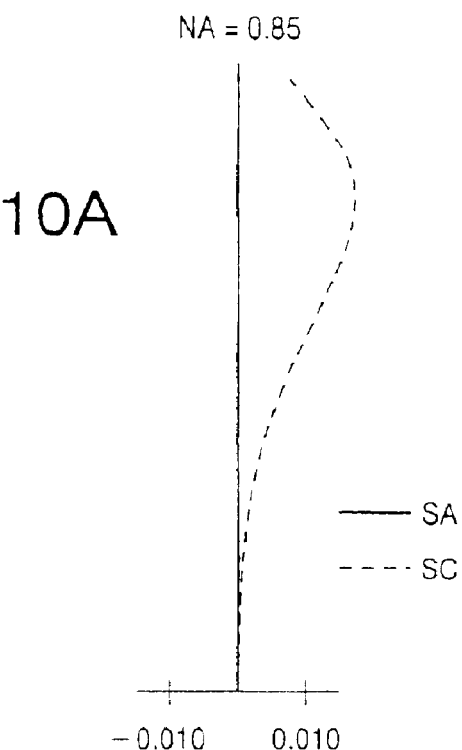
FIG. 10A is a graph showing the spherical aberration and the sine condition under the reference design condition, according to the second embodiment.
Figure 10B:
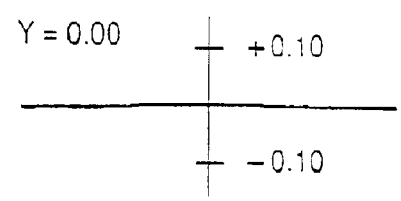
FIG. 10B is a graph showing the wavefront aberration under the reference design condition, according to the second embodiment.

FIG. 10A is a graph showing the spherical aberration SA and the sine condition SC, and FIG. 10B is a graph showing the wavefront aberration under the reference design condition.

As shown in FIG. 10A, the sine condition (SC) has a maximum value at a position approximately 80% of the radius h of the effective aperture, and decreases monotonously in a region outside that position. The spherical aberration (SA) is well compensated for. Further, as shown in FIG. 10B, the wavefront aberration is well suppressed.

According to the second embodiment, if the thickness of the cover layer 11 changes by +0.030 mm, the degree of divergence/convergence of the light beam incident on the objective lens 20 is changed such that the imaging magnification after the compensation becomes −0.00573.

Figure 11A:
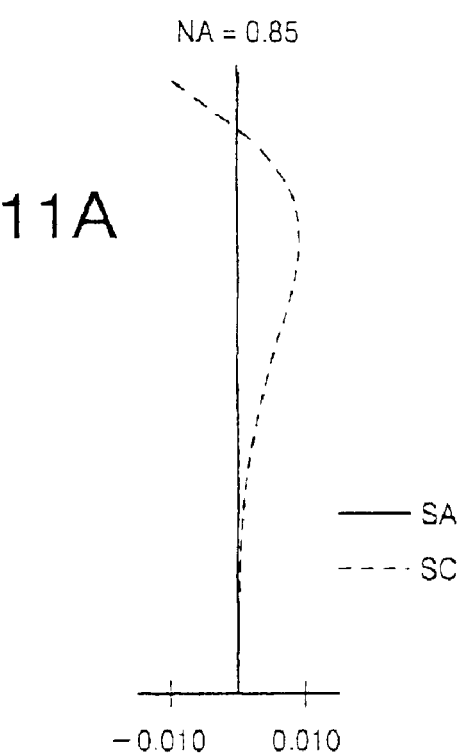
FIG. 11A shows the compensated spherical aberration and sine condition, according to the second embodiment.
Figure 11B:
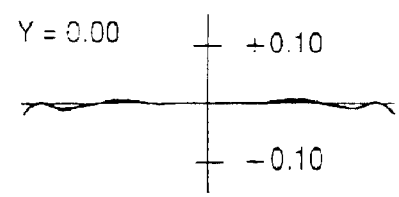
FIG. 11B shows the compensated wavefront aberration after the compensation according to the second embodiment.

FIG. 11A shows the spherical aberration and sine condition, and FIG. 11B shows the wavefront aberration after the compensation. As shown in FIG. 11A, the spherical aberration is well compensated over the entire aperture. In this case, the amount of change of the wavefront aberration ΔW(1.0) in the outermost region of the effective aperture is 3.73λ, which can substantially cancel the change of the wavefront aberration (i.e., −3.82λ) caused by the thickness error of the cover layer. As a result, as shown in FIG. 11B, the wavefront aberration can be well compensated. The rms value of the wavefront aberration after the compensation is 0.006λ.

Third Embodiment

The objective lens 20 according to the third embodiment will be described hereinafter.

The numerical configuration of the objective lens 20 according to the third embodiment is indicated in TABLE 7, and coefficients indicating the spherical surfaces thereof are indicated in TABLE 8.

TABLE 7

| f = 0.587 Surface | NA 0.851 | | |
|---|---|---|---|
| Number | r | D | N |
| #1 | 0.428 | 0.629 | 1.67033 |
| #2 | −1.992 | 0.179 | |
| #3 | ∞ | 0.100 | 1.62231 |
| #4 | ∞ | | |

TABLE 8

| | 1st surface | 2nd surface |
|---|---|---|
| κ | −0.5200 | 0.0000 |
| A4 | $1.60491 \times 10^{-01}$ | $5.67812 \times 10^{+00}$ |
| A6 | $5.37045 \times 10^{-01}$ | $-3.92966 \times 10^{+01}$ |
| A8 | $3.17453 \times 10^{+00}$ | $1.38769 \times 10^{+02}$ |
| A10 | $-3.72889 \times 10^{+00}$ | $-1.69072 \times 10^{+02}$ |
| A12 | $4.19709 \times 10^{+01}$ | $-1.45119 \times 10^{+02}$ |

The reference design condition for designing the objective lens 20 according to the third embodiment is a condition where the object distance is infinity (i.e., the light beam incident on the objective lens is parallel light) and the thickness of the cover layer 11 is 0.100 mm.

FIG. 12A is a graph showing the spherical aberration SA and the sine condition SC, and FIG. 12B is a graph showing the wavefront aberration under the reference design condition.

As shown in FIG. 12A, the sine condition (SC) has a maximum value at a position approximately 80% of the radius h of the effective aperture, and decreases monotonously in a region outside that position. The spherical aberration (SA) is well compensated for. Further, as shown in FIG. 12B, the wavefront aberration is well suppressed.

According to the third embodiment, if the thickness of the cover layer 11 changes by +0.030 mm, the degree of divergence/convergence of the light beam incident on the objective lens 20 is changed such that the imaging magnification after the compensation becomes −0.0217. FIG. 13A shows the spherical aberration and sine condition, and FIG. 13B shows the wavefront aberration after the compensation. As shown in FIG. 13A, the spherical aberration is well compensated over the entire aperture. In this case, the amount of change of the wavefront aberration ΔW(1.0) in the outermost region of the effective aperture is 3.83λ, which can substantially cancel the change of the wavefront aberration (i.e., −3.82λ) caused by the thickness error of the cover layer. As a result, as shown in FIG. 13B, the wavefront aberration can be well compensated. The rms value of the wavefront aberration after the compensation is 0.010λ.

Fourth Embodiment

The objective lens 20 according to the fourth embodiment will be described hereinafter.

The numerical configuration of the objective lens 20 according to the fourth embodiment is indicated in TABLE 9, and coefficients indicating the spherical surfaces thereof are indicated in TABLE 10.

TABLE 9

| f = 0.587 Surface | | NA 0.851 | |
|---|---|---|---|
| Number | r | D | N |
| 1 | 0.458 | 0.644 | 1.76250 |
| 2 | −7.582 | 0.168 | |
| 3 | ∞ | 0.100 | 1.62231 |
| 4 | ∞ | | |

TABLE 10

| | 1st surface | 2nd surface |
|---|---|---|
| κ | −0.5200 | 0.0000 |
| A4 | 1.95500 × 10$^{-01}$ | 4.93340 × 10$^{+00}$ |
| A6 | 5.90739 × 10$^{-01}$ | −3.66495 × 10$^{+01}$ |
| A8 | 1.92388 × 10$^{+00}$ | 1.01985 × 10$^{+02}$ |
| A10 | 7.66906 × 10$^{-01}$ | 2.07627 × 10$^{+02}$ |
| A12 | 1.86683 × 10$^{+01}$ | −1.39325 × 10$^{+03}$ |

The reference design condition for designing the objective lens 20 according to the fourth embodiment is a condition where the object distance is infinity (i.e., the light beam incident on the objective lens is parallel light) and the thickness of the cover layer 11 is 0.100 mm.

FIG. 14A is a graph showing the spherical aberration SA and the sine condition SC, and FIG. 14B is a graph showing the wavefront aberration under the reference design condition.

As shown in FIG. 14A, the sine condition (SC) has a maximum value at a position approximately 90% of the radius h of the effective aperture, and decreases monotonously in a region outside that position. The spherical aberration (SA) is well compensated for. Further, as shown in FIG. 14B, the wavefront aberration is well suppressed.

According to the fourth embodiment, if the thickness of the cover layer 11 changes by +0.030 mm, the degree of divergence/convergence of the light beam incident on the objective lens 20 is changed such that the imaging magnification after the compensation becomes −0.0226. FIG. 15A shows the spherical aberration and sine condition, and FIG. 15B shows the wavefront aberration after the compensation. As shown in FIG. 15A, the spherical aberration is well compensated over the entire aperture. In this case, the amount of change of the wavefront aberration ΔW(1.0) in the outermost region of the effective aperture is 3.62λ, which can substantially cancel the change of the wavefront aberration (i.e., −3.82λ) caused by the thickness error of the cover layer. As a result, as shown in FIG. 15B, the wavefront aberration can be well compensated. The rms value of the wavefront aberration after the compensation is 0.006λ.

Fifth Embodiment

The objective lens 20 according to the fifth embodiment will be described hereinafter.

The numerical configuration of the objective lens 20 according to the fifth embodiment is indicated in TABLE 11, and coefficients indicating the spherical surfaces thereof are indicated in TABLE 12.

TABLE 11

| f = 1.000 Surface | | NA 0.850 | |
|---|---|---|---|
| Number | r | D | N |
| 1 | 0.743 | 1.364 | 1.67033 |
| 2 | −1.804 | 0.202 | |
| 3 | ∞ | 0.100 | 1.62231 |
| 4 | ∞ | | |

TABLE 12

| | 1st surface | 2nd surface |
|---|---|---|
| κ | −0.5200 | 0.0000 |
| A4 | 3.58380 × 10$^{-02}$ | 4.79500 × 10$^{+00}$ |
| A6 | 3.81025 × 10$^{-02}$ | −3.65747 × 10$^{+01}$ |
| A8 | 4.85835 × 10$^{-02}$ | 1.74201 × 10$^{+02}$ |
| A10 | 3.36867 × 10$^{-03}$ | −4.74031 × 10$^{+02}$ |
| A12 | 5.29857 × 10$^{-02}$ | 5.63992 × 10$^{+02}$ |

The reference design condition for designing the objective lens 20 according to the fifth embodiment is a condition where the object distance is infinity (i.e., the light beam incident on the objective lens is parallel light) and the thickness of the cover layer 11 is 0.100 mm.

Figure 16A:
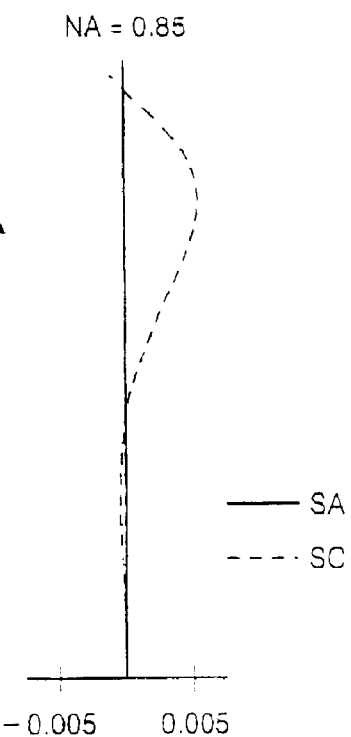
FIG. 16A is a graph showing the spherical aberration and the sine condition under the reference design condition, according to the fifth embodiment.
Figure 16B:
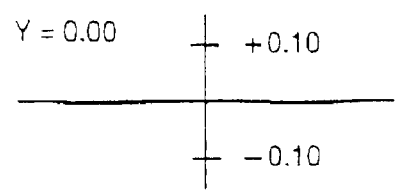
FIG. 16B is a graph showing the wavefront aberration under the reference design condition, according to the fifth embodiment.

FIG. 16A is a graph showing the spherical aberration SA and the sine condition SC, and FIG. 16B is a graph showing the wavefront aberration under the reference design condition.

As shown in FIG. 16A, the sine condition (SC) has a maximum value at a position approximately 80% of the radius h of the effective aperture, and decreases monotonously in a region outside that position. The spherical aberration (SA) is well compensated for. Further, as shown in FIG. 16B, the wavefront aberration is well suppressed.

Figure 17A:
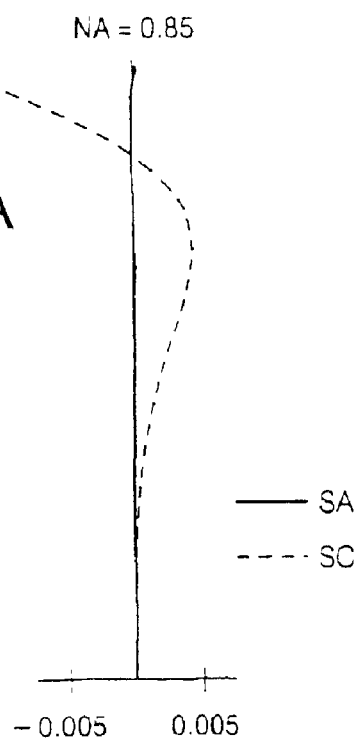
FIG. 17A shows the compensated spherical aberration and sine condition, according to the fifth embodiment.
Figure 17B:
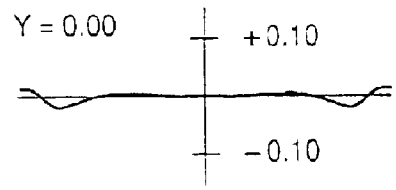
FIG. 17B shows the compensated wavefront aberration after the compensation according to the fifth embodiment.

According to the fifth embodiment, if the thickness of the cover layer 11 changes by +0.030 mm, the degree of divergence/convergence of the light beam incident on the objective lens 20 is changed such that the imaging magnification after the compensation becomes −0.0131. FIG. 17A shows the spherical aberration and sine condition, and FIG. 17B shows the wavefront aberration after the compensation. As shown in FIG. 17A, the spherical aberration is well compensated over the entire aperture. In this case, the amount of change of the wavefront aberration ΔW(1.0) in the outermost region of the effective aperture is 3.84λ, which can substantially cancel the change of the wavefront aberration (i.e., −3.82λ) caused by the thickness error of the cover layer. As a result, as shown in FIG. 17B, the wavefront aberration can be well compensated. The rms value of the wavefront aberration after the compensation is 0.013λ.

Sixth Embodiment

The objective lens 20 according to the sixth embodiment will be described hereinafter.

The numerical configuration of the objective lens 20 according to the sixth embodiment is indicated in TABLE 13, and coefficients indicating the spherical surfaces thereof are indicated in TABLE 14.

TABLE 13 f = 1.000
NA 0.800

| Surface Number | r | D | N |
|---|---|---|---|
| 1 | 0.676 | 1.326 | 1.56023 |
| 2 | −0.967 | 0.234 | |
| 3 | ∞ | 0.100 | 1.62231 |
| 4 | ∞ | | |

TABLE 14

| | 1st surface | 2nd surface |
|---|---|---|
| κ | −0.5200 | 0.0000 |
| A4 | $2.06448 \times 10^{-02}$ | $5.51772 \times 10^{+00}$ |
| A6 | $3.32397 \times 10^{-02}$ | $-3.88077 \times 10^{+01}$ |
| A8 | $3.80805 \times 10^{-02}$ | $1.85027 \times 10^{+02}$ |
| A10 | $6.37704 \times 10^{-02}$ | $-5.07488 \times 10^{+02}$ |
| A12 | $-6.35130 \times 10^{-02}$ | $6.06055 \times 10^{+02}$ |

The reference design condition for designing the objective lens 20 according to the sixth embodiment is a condition where the object distance is infinity (i.e., the light beam incident on the objective lens is parallel light) and the thickness of the cover layer 10 is 0.100 mm.

Figure 18A:
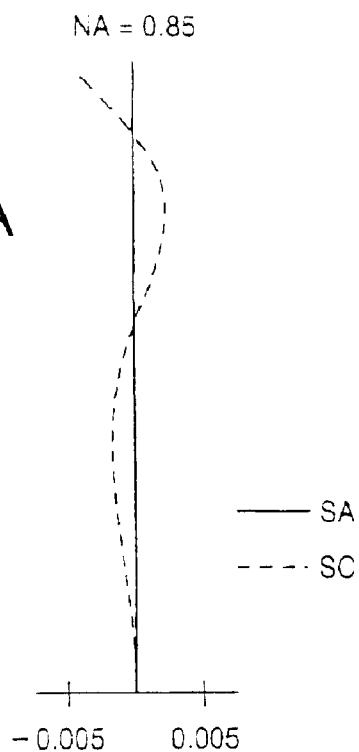
FIG. 18A is a graph showing the spherical aberration and the sine condition under the reference design condition, according to the sixth embodiment.
Figure 18B:
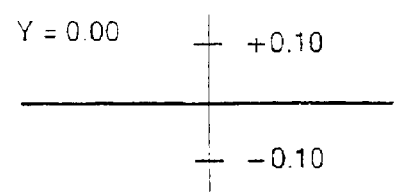
FIG. 18B is a graph showing the wavefront aberration under the reference design condition, according to the sixth embodiment.

FIG. 18A is a graph showing the spherical aberration SA and the sine condition SC, and FIG. 18B is a graph showing the wavefront aberration under the reference design condition.

As shown in FIG. 18A, the sine condition (SC) has a maximum value at a position approximately 80% of the radius h of the effective aperture, and decreases monotonously in a region outside that position. The spherical aberration (SA) is well compensated for. Further, as shown in FIG. 18B, the wavefront aberration is well suppressed.

Figure 19A:
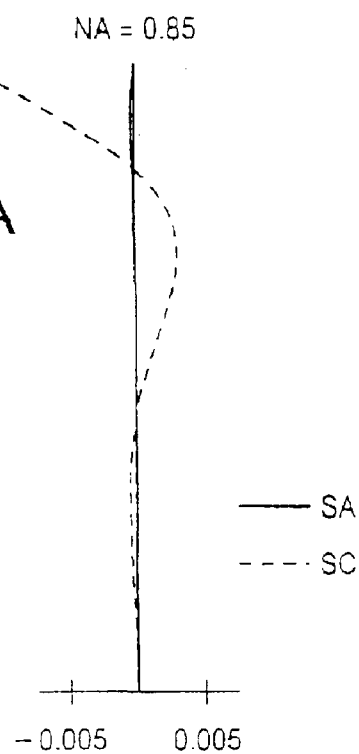
FIG. 19A shows the compensated spherical aberration and sine condition, according to the sixth embodiment.
Figure 19B:
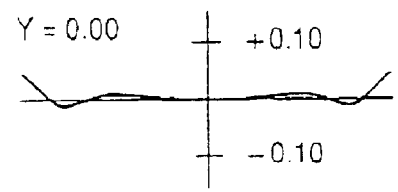
FIG. 19B shows the compensated wavefront aberration after the compensation according to the sixth embodiment.

According to the sixth embodiment, if the thickness of the cover layer 11 changes by −0.030 mm, the degree of divergence/convergence of the light beam incident on the objective lens 20 is changed such that the imaging magnification after the compensation becomes −0.0127. FIG. 19A shows the spherical aberration and sine condition, and FIG. 19B shows the wavefront aberration after the compensation. As shown in FIG. 19A, the spherical aberration is well compensated over the entire aperture. In this case, the amount of change of the wavefront aberration ΔW(1.0) in the outermost region of the effective aperture is 2.75λ, which can substantially cancel the change of the wavefront aberration (i.e., −3.82λ) caused by the thickness error of the cover layer. As a result, as shown in FIG. 19B, the wavefront aberration can be well compensated. The rms value of the wavefront aberration after the compensation is 0.014λ.

TABLE 15 shows values of each embodiment with respect to conditions (1) through (3).

As known from TABLE 15, the first and second embodiments satisfy all the conditions (1) through (3). Therefore, according to the first and second embodiments, the change of the spherical aberration due to the change of the thickness of the cover layer of the optical disc and the change of the spherical aberration due to errors of the thickness of the lens and/or refractive index can be well compensated for by varying the degree of divergence/convergence of the light beam incident on the objective lens, with the abaxial coma being well suppressed.

The third through sixth embodiment satisfy conditions (1) and (2). Therefore, according to the third through sixth embodiments, the change of the spherical aberration due to the change of the thickness of the cover layer of the optical disc can be well compensated for by varying the degree of divergence/convergence of the light beam incident on the objective lens, with the abaxial coma being well suppressed.

TABLE 15

| condition | (1) | (2) | (3) |
|---|---|---|---|
| 1st EMBODIMENT | 0.0038 | −0.289 | 0.095 |
| 2nd EMBODIMENT | 0.0075 | −0.295 | 0.071 |
| 3rd EMBODIMENT | 0.0073 | −0.321 | −0.295 |
| 4th EMBODIMENT | 0.0111 | −0.291 | −0.077 |
| 5th EMBODIMENT | 0.0053 | −0.315 | −0.554 |
| 6th EMBODIMENT | 0.0024 | −0.335 | −1.034 |

TABLE 16 shows changes of the wavefront aberration, which are obtained based on the design data of respective objective lenses, when the degree of divergence/convergence of the beam incident on the objective lens is changed corresponding to the thickness error of +0.030 mm of the cover layer.

TABLE 17 shows a relationship between the NA of the embodiments and values of proportionality factor a by which the value obtained by equation (4) is multiplied.

TABLE 18 shows the values of wavefront aberration calculated from equation (4).

TABLE 19 shows a difference between the aberration shown in TABLEs 16 and 18.

In TABLEs, a pupil coordinate represents a ratio h/hmax, where h represents a ray height with respect to the objective lens, hmax represents a height of the outermost height of the pupil of the objective lens. TABLEs 16 and 18 indicate amounts of aberration of rays passing through respective pupil coordinates.

TABLE 16

| Pupil coordinates | 1st EMB. | 2nd EMB. | 3rd EMB. | 4th EMB. | 5th EMB. | 6th EMB. |
|---|---|---|---|---|---|---|
| 1.0 | 3.82 | 3.73 | 3.83 | 3.62 | 3.84 | 2.75 |
| 0.9 | 2.05 | 2.00 | 2.01 | 1.96 | 2.03 | 1.51 |
| 0.8 | 1.12 | 1.07 | 1.07 | 1.06 | 1.07 | 0.81 |
| 0.7 | 0.60 | 0.57 | 0.58 | 0.56 | 0.56 | 0.44 |
| 0.6 | 0.30 | 0.29 | 0.30 | 0.29 | 0.29 | 0.23 |
| 0.5 | 0.14 | 0.13 | 0.14 | 0.13 | 0.14 | 0.11 |
| 0.4 | 0.06 | 0.05 | 0.06 | 0.05 | 0.06 | 0.05 |
| 0.3 | 0.02 | 0.02 | 0.02 | 0.02 | 0.02 | 0.02 |
| 0.2 | 0.00 | 0.00 | 0.00 | 0.00 | 0.00 | 0.00 |
| 0.1 | 0.00 | 0.00 | 0.00 | 0.00 | 0.00 | 0.00 |
| 0.0 | 0.00 | 0.00 | 0.00 | 0.00 | 0.00 | 0.00 |

TABLE 17

| | 1st EMB. | 2nd EMB. | 3rd EMB. | 4th EMB. | 5th EMB. | 6th EMB. |
|---|---|---|---|---|---|---|
| NA | 0.851 | 0.851 | 0.851 | 0.851 | 0.850 | 0.800 |
| α | 74.06 | 72.13 | 73.64 | 70.15 | 74.33 | 76.38 |

TABLE 18

| Pupil coordinates | 1st EMB. | 2nd EMB. | 3rd EMB. | 4th EMB. | 5th EMB. | 6th EMB. |
|---|---|---|---|---|---|---|
| 1.0 | 3.82 | 3.72 | 3.80 | 3.62 | 3.80 | 2.72 |
| 0.9 | 2.07 | 2.01 | 2.06 | 1.96 | 2.06 | 1.54 |
| 0.8 | 1.12 | 1.09 | 1.12 | 1.06 | 1.12 | 0.86 |
| 0.7 | 0.59 | 0.58 | 0.59 | 0.56 | 0.59 | 0.46 |
| 0.6 | 0.29 | 0.29 | 0.29 | 0.28 | 0.29 | 0.23 |
| 0.5 | 0.13 | 0.13 | 0.13 | 0.13 | 0.13 | 0.11 |
| 0.4 | 0.05 | 0.05 | 0.05 | 0.05 | 0.05 | 0.04 |
| 0.3 | 0.02 | 0.02 | 0.02 | 0.01 | 0.02 | 0.01 |
| 0.2 | 0.00 | 0.00 | 0.00 | 0.00 | 0.00 | 0.00 |
| 0.1 | 0.00 | 0.00 | 0.00 | 0.00 | 0.00 | 0.00 |
| 0.0 | 0.00 | 0.00 | 0.00 | 0.00 | 0.00 | 0.00 |

TABLE 19

| Pupil coordinates | 1st EMB. | 2nd EMB. | 3rd EMB. | 4th EMB. | 5th EMB. | 6th EMB. |
|---|---|---|---|---|---|---|
| 1.0 | 0.00 | 0.01 | 0.04 | 0.00 | 0.04 | 0.03 |
| 0.9 | −0.01 | −0.01 | −0.04 | 0.00 | −0.03 | −0.03 |
| 0.8 | 0.00 | −0.02 | −0.04 | 0.00 | −0.05 | −0.04 |
| 0.7 | 0.01 | −0.01 | −0.01 | 0.01 | −0.03 | −0.02 |
| 0.6 | 0.01 | 0.00 | 0.01 | 0.01 | 0.00 | 0.00 |
| 0.5 | 0.01 | 0.01 | 0.01 | 0.01 | 0.00 | 0.01 |
| 0.4 | 0.00 | 0.00 | 0.01 | 0.01 | 0.00 | 0.01 |
| 0.3 | 0.00 | 0.00 | 0.00 | 0.00 | 0.00 | 0.00 |
| 0.2 | 0.00 | 0.00 | 0.00 | 0.00 | 0.00 | 0.00 |
| 0.1 | 0.00 | 0.00 | 0.00 | 0.00 | 0.00 | 0.00 |
| 0.0 | 0.00 | 0.00 | 0.00 | 0.00 | 0.00 | 0.00 |

An error of the value of wavefront aberration based on equation (4) multiplied by an appropriate proportionality factor a with respect to that calculated from the design data is approximately 5% at the greatest. Accordingly, by designing an objective lens so that the wavefront aberration caused by the variation of the degree of divergence/convergence of the incident light is proportional to the value obtained from equation (4), an objective lens substantially similar to those shown above as the embodiments can be obtained. With such an objective lens, as described above, the wavefront aberration caused by the thickness error of the cover layer of the optical disc can be well compensated for.

As described above, according to the embodiments, by appropriately setting the compensation condition of coma under the reference design condition, the change of the spherical aberration due to the change of the thickness of the cover layer of the optical disc and/or the thickness of the lens and/or the error of refractive index can be compensated by changing the degree of divergence/convergence of the light beam incident on the objective lens.

Further, since an optical system for varying the degree of divergence/convergence of the incident light beam is provided separately from the objective lens, allowance for the error of the surface shape of the objective lens can be widened, which enables forming a high NA single-element objective lens, which is relatively difficult to manufacture. Such a single-element objective lens is light in weight and compact in comparison with the conventional two-element objective lens, which reduces the burden to the fine actuator, and allows a sufficient working distance.

The present disclosure relates to the subject matter contained in Japanese Patent Application No. 2001-271452, filed on Sep. 7, 2001.

What is claimed is:

1. A single-element objective lens for an optical pick-up, said objective lens directing an incident light beam to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the incident beam is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident beam, wherein an amount of an offence against a sine condition has a positive maximum value at a position within a range of 60% to 90% of an effective radius of said objective lens, the difference with respect to the sine condition monotonously decreasing on a peripheral side with respect to the position at which the difference has the maximum value.

2. The objective lens according to claim 1, said objective lens being configured to satisfy condition:

$$0.001 < SC_{max}/f < 0013,$$

wherein $SC_{max}$ represent the positive maximum value of an amount of an offence against the sine condition when the incident beam is a parallel light beam, and f represents a focal length of said objective lens.

3. The objective lens according to claim 3, wherein said objective lens is configured to satisfy condition:

$$0.37 < \Delta W(1.0) \times \lambda/(f \times m \times NA_{max}^6) < -0.25,$$

wherein, $\Delta W(1.0)$ represents wavefront aberration in an outermost position of the effective aperture, $\lambda$ represents a wavelength of the light beam, m represents a lateral magnification, $NA_{max}$ represents a numerical aperture corresponding to the effective aperture.

4. The objective lens according to claim 3, wherein said objective lens is configured to satisfy condition:

$$0.050 < f/r_2 < 0.110,$$

wherein, $r_2$ represents a curvature of radius of a surface of said objective lens facing the optical disc.

5. A single-element objective lens for an optical pick-up, said objective lens directing an incident light beam to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the incident beam is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident beam, wherein said objective lens is configured to satisfy condition:

$$0.37 \Delta W(1.0) \times \lambda/(f \times m \times NA_{max}^6) < -0.25,$$

wherein, $\Delta W(1.0)$ represents wavefront aberration in an outermost position of the effective aperture, $\lambda$ represents a wavelength of the light beam, m represents a lateral magnification, $NA_{max}$, represents a numerical aperture corresponding to the effective aperture, and f represents a focal length of said objective lens.

6. A single-element objective lens for an optical pick-up, said objective lens directing an incident light beam to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the incident beam is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident beam, wherein said objective lens is configured to satisfy condition:

$$0.050 < f/r_2 < 0.110,$$

wherein, $r_2$ represents a curvature of radius of a surface of said objective lens facing the optical disc, and f represents a focal length of said objective lens.

7. An optical pick-up, comprising:

a laser source that emits a laser beam;

a single-element objective lens, said objective lens directing the laser beam emitted by said laser source to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the laser beam incident on said objective lens is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident beam; and an optical device capable of changing the degree of divergence/convergence of the laser beam incident on said objective lens, wherein an amount of an offence against a sine condition has a positive maximum value at a position within a range of 60% to 90% of an effective radius of said objective lens, an amount of an offence against the sine condition monotonously decreasing on a peripheral side with respect to the position at which the difference has the maximum value.

8. The optical pick-up according to claim 7, wherein said laser source includes:

a laser diode that emits a divergent laser beam; and a collimating lens that collimates the divergent laser beam emitted by said laser diode, the collimated laser beam being emitted from said laser source to said objective lens, wherein said optical device includes said collimating lens, the degree of divergence/convergence of the laser beam emitted by said laser source being changed by changing a distance between said laser diode and said collimating lens.

9. An optical pick-up, comprising:

a laser source that emits a laser beam;

a single-element objective lens, said objective lens directing the laser beam emitted by said laser source to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the laser beam incident on said objective lens is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident beam; and an optical device capable of changing the degree of divergence/convergence of the laser beam incident on said objective lens, said objective lens being configured to satisfy condition:

$$0.00 < SC_{max} < 0.013,$$

wherein $SC_{max}$ represent the positive maximum value of an amount of an offence against the sine condition when the incident beam is a parallel light beam, and f represents a focal length of said objective lens.

10. An optical pick-up, comprising:

a laser source that emits a laser beam;

a single-element objective lens, said objective lens directing the laser beam emitted by said laser source to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the laser beam incident on said objective lens is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident an optical device capable of changing the degree of divergence/convergence of the laser beam incident on said objective lens, wherein said objective lens is configured to satisfy condition:

$$0.37 \Delta W(1.0) \times \lambda / (f \times m \times NA_{max}^6) < -0.25,$$

wherein, $\Delta W(1.0)$ represents wavefront aberration in an outermost position of the effective aperture, $\lambda$ represents a wavelength of the light beam, m represents a lateral magnification, $NA_{max}$ represents a numerical aperture corresponding to the effective aperture, and f represents a focal length of said objective lens.

11. An optical pick-up, comprising:

a laser source that emits a laser beam:

a single-element objective lens, said objective lens directing the laser beam emitted by said laser source to a data recording surface of an optical disc through a cover layer to form a beam spot, a numerical aperture of said objective lens being 0.7 or more, said objective lens being configured to compensate for coma such that a characteristic of a change of spherical aberration due to a degree of divergence/convergence of the laser beam incident on said objective lens is substantially comparable with respect to a characteristic of a change of spherical aberration due to variation of the cover layer, thereby the change of spherical aberration due to variation of the cover layer can be cancelled by the change of spherical aberration due to a degree of divergence/convergence of the incident an optical device capable of changing the degree of divergence/convergence of the laser beam incident on said objective lens, wherein said objective lens is configured to satisfy condition:

$$0.050 < f/r_2 < 0.110,$$

wherein, $r_2$ represents a curvature of radius of a surface of said objective lens facing the optical disc, and f represents a focal length of said objective lens.

* * * * *